UNITED STATES PATENT OFFICE.

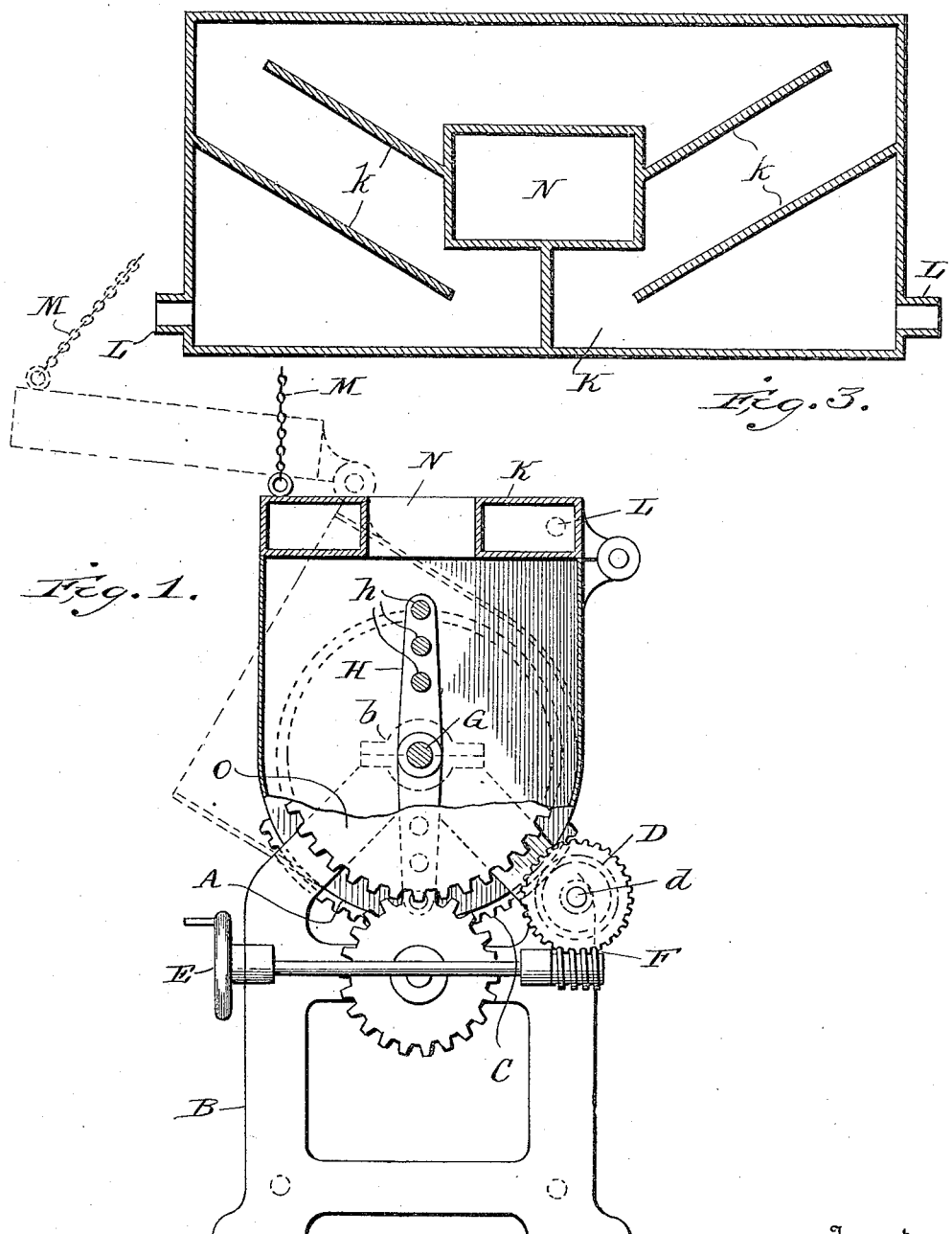

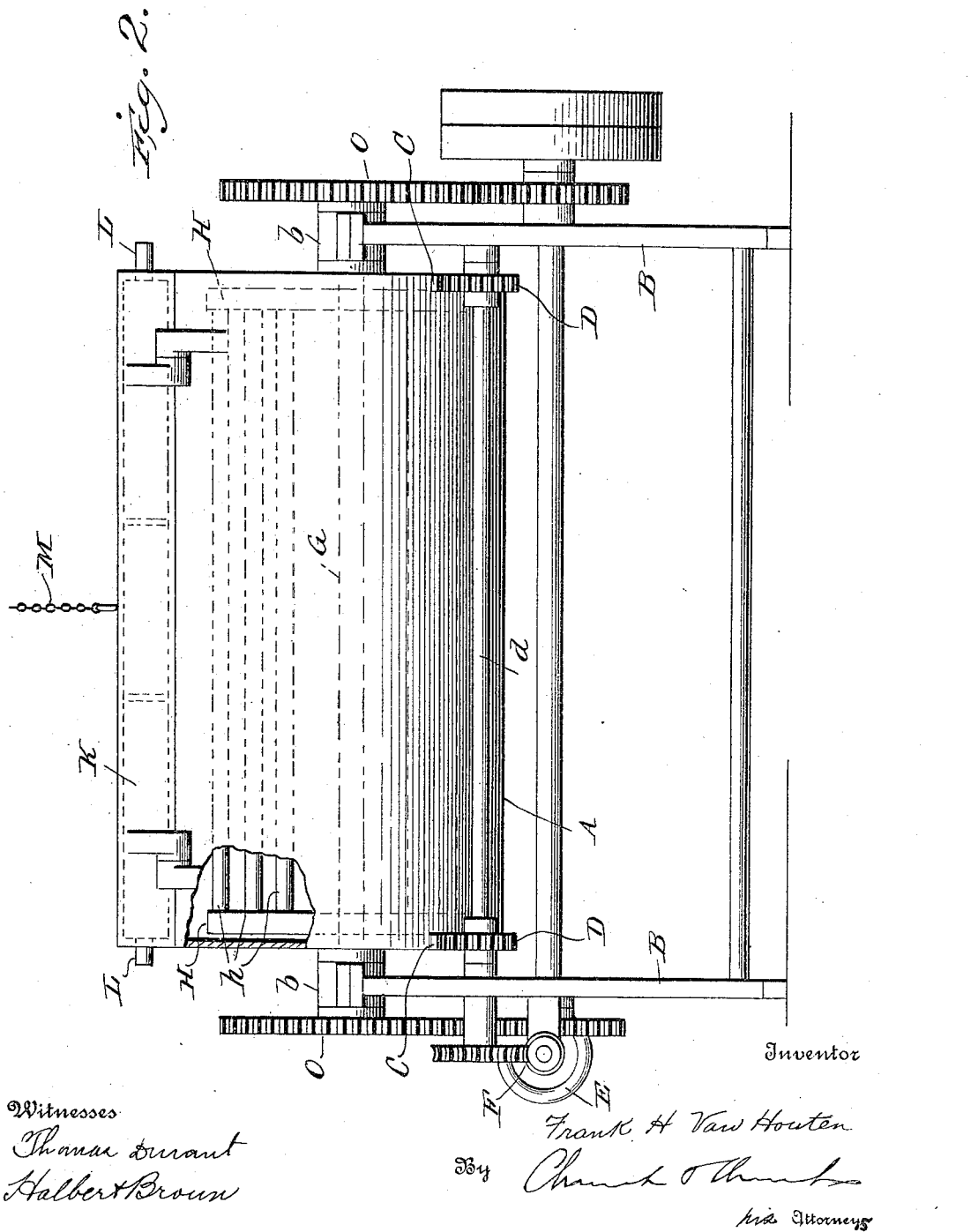

FRANK H. VAN HOUTEN, OF FISHKILL-ON-THE-HUDSON, NEW YORK.

DOUGH-BEATING MACHINE.

1,122,670.   Specification of Letters Patent.   Patented Dec. 29, 1914.

Application filed March 30, 1912. Serial No. 687,435.

*To all whom it may concern:*

Be it known that I, FRANK H. VAN HOUTEN, a citizen of the United States, residing at Fishkill-on-the-Hudson, Dutchess county, State of New York, have invented certain new and useful Improvements in Dough-Beating Machines; and I do hereby declare the following to be a full, clear, and exact description of the same, reference being had to the accompanying drawings, forming part of this specification, and to the figures and letters of reference marked thereon.

This invention relates to dough beating machines of that type wherein the dough is beaten with such speed and violence that its temperature is raised to a point which would be injurious if no means were provided for absorbing the generated heat, the objects of the invention being to simplify and improve the construction, whereby a more efficient drawing, stretching and beating of the dough may be effected without danger of over heating, and whereby danger of chilling any portion of the mass is avoided.

In the accompanying drawings,—Figure 1 is a transverse section through a dough beating machine embodying the present improvements, the dotted lines showing the parts in a tilted position. Fig. 2 is a rear elevation of the machine. Fig. 3 is a section in a horizontal plane to show the circulating passages in the cooler or cover.

Like letters of reference in the several figures indicate the same parts.

The receptacle for the dough is preferably of the usual trough-shape, that is to say, it has the semicylindrical dough supporting bottom A with upwardly extending side walls and is supported at the ends in fixed bearings b in end frame B. The ends of the receptacle are provided with segmental racks C with which pinions D on a shaft d mesh, said shaft being adapted to be turned by a crank handle E through a worm and worm wheel F, for the purpose of tilting the receptacle to discharge the mass of dough. Extending longitudinally through the receptacle and through the bearings b is a shaft G carrying within the receptacle suitable beaters preferably formed by arms H rigid with the shaft and a plurality of rods h extending between the ends of the arms, the outermost rods being adapted to travel in a path in proximity to the dough supporting surface of the receptacle. Said dough supporting surface, as well as the beater and parts with which the dough contacts for any length of time, are of such construction that they may substantially conform to the temperature of the mass of dough with the result that the dough adheres thereto and by the movement of the beater the dough is drawn and stretched to develop its gluten content, as well as subjected to the beating action. Such drawing, stretching and beating is according to modern methods carried on with such violence and at such speed that the temperature of the mass of dough rises rapidly and if allowed to continue results in serious injury to the quality of the dough. Various means have been suggested for keeping the temperature down to the desired degree, but difficulties have arisen, because of the fact that moisture condenses on the cooled surface, thereby preventing the adhesion of the dough thereto, and if such surface be either the beater or the dough supporting surface, a very ineffective drawing and stretching action results, as the mass slides on the surfaces and is simply thrown about by the beater.

In accordance with the present invention, a cooler is located above the path of the beater in a position where it will absorb the heat from the hottest portion of the air in the receptacle and by direct contact with such portions of the mass of dough as may be thrown upwardly by the operation of the beater. The cooler conveniently takes the form of a cover K for the receptacle. It is made hollow with a sinuous passage therethrough formed by partitions k and inlet and outlet ducts L for the admission and dicharge of the circulating cooling medium such as brine artificially cooled. The cover may be hinged at its rear edge to the edge of the receptacle and balanced or supported when the receptacle is swung forwardly by a chain or flexible connection M, as shown clearly in Fig. 1. With this construction not only is the generated heat absorbed and the temperature of the mass kept down to the desired degree without introducing any complications in the receptacle, but the cover is kept free from adhering dough, a result which in connection with the cover is decidedly advantageous. The cover may be provided, as shown, with a central opening N for the admission of the ingredients to be beaten, and any suitable closure for the opening may be provided. The beater is driven from any suitable source of power through gearing O connected with one end of the beater shaft, as usual.

Having thus described my invention, what I claim as new and desire to secure by Letters Patent of the United States, is:

1. In a dough beating machine wherein the beating is accompanied by a rise in the temperature of the mass, the combination with a receptacle having a dough supporting wall the temperature of which may substantially conform to that of the dough, whereby the dough will adhere thereto, and a cooler forming a dough confining wall above the dough, and a rotary dough beater within the receptacle.

2. In a dough beating machine, wherein the beating is accompanied by a rise in the temperature of the mass, the combination with a receptacle having a semi-cylindrical dough supporting wall, the temperature of which may substantially conform to that of the dough to facilitate adhesion, and a beater mounted to rotate on an axis at substantially the center of the cylindrical dough supporting wall, and a hollow cover for the receptacle with means for the circulation of a cooling medium therethrough, whereby the generated heat will be absorbed and adhesion of the dough to the cover prevented.

FRANK H. VAN HOUTEN.

Witnesses:
J. M. VAN HOUTEN,
WILLIAM T. STRIPPEL.

Copies of this patent may be obtained for five cents each, by addressing the " Commissioner of Patents, Washington, D. C."